(12) United States Patent
Lee et al.

(10) Patent No.: US 12,533,065 B2
(45) Date of Patent: Jan. 27, 2026

(54) METHOD AND APPARATUS FOR CLASSIFYING SUBJECT INDEPENDENT DRIVER STATE USING BIO-SIGNAL

(71) Applicant: KOREA UNIVERSITY RESEARCH AND BUSINESS FOUNDATION, Seoul (KR)

(72) Inventors: Seong Whan Lee, Seoul (KR); Dong Young Kim, Seoul (KR); Dong-Kyun Han, Seoul (KR); Woo Jeoung Nam, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 168 days.

(21) Appl. No.: 18/364,575

(22) Filed: Aug. 3, 2023

(65) Prior Publication Data

US 2024/0188868 A1 Jun. 13, 2024

(30) Foreign Application Priority Data

Aug. 3, 2022 (KR) .......................... 10-2022-0096913

(51) Int. Cl.
  *B60R 16/037* (2006.01)
  *A61B 5/00* (2006.01)
  *A61B 5/16* (2006.01)
  *A61B 5/18* (2006.01)
  *B60R 16/023* (2006.01)

(52) U.S. Cl.
  CPC ............... *A61B 5/18* (2013.01); *A61B 5/165* (2013.01); *A61B 5/7267* (2013.01); *B60R 16/023* (2013.01); *B60R 16/037* (2013.01)

(58) Field of Classification Search
  CPC ........... A61B 5/165; A61B 5/18; A61B 5/389; A61B 5/7267; B60R 16/023
  See application file for complete search history.

(56) References Cited

U.S. PATENT DOCUMENTS

| | | | |
|---|---|---|---|
| 2005/0128092 A1* | 6/2005 | Bukman | B60W 40/08 340/576 |
| 2007/0041552 A1* | 2/2007 | Moscato | H04M 1/72454 379/214.01 |
| 2008/0154438 A1* | 6/2008 | Kalik | A61B 5/18 701/1 |

(Continued)

FOREIGN PATENT DOCUMENTS

| | | |
|---|---|---|
| KR | 10-2019-0023554 A | 3/2019 |
| KR | 10-2019-0067302 A | 6/2019 |
| KR | 10-1999211 B1 | 7/2019 |

*Primary Examiner* — Matthew J. Reda
(74) *Attorney, Agent, or Firm* — NSIP Law

(57) ABSTRACT

A method of classifying, by an apparatus including a processor and a memory, a subject-independent driver state according to an embodiment of the present disclosure may include (a) learning a state classification model that receives one or more drivers' bio-signal data from a database to output the drivers' state classification (b) receiving a new driver's bio-signal, (c) preprocessing the received new driver's bio-signal, and (d) inputting the preprocessed new driver's bio-signal to the state classification model to output the driver's state classification result, wherein the bio-signal is at least one of an electroencephalogram (EEG), an electrooculogram (EOG), an electrocardiogram (ECG), and a photoplethysmogram (PPG).

9 Claims, 7 Drawing Sheets

(56) References Cited

U.S. PATENT DOCUMENTS

| | | | |
|---|---|---|---|
| 2009/0034796 A1* | 2/2009 | Johns | B60K 28/066 |
| | | | 382/103 |
| 2010/0219955 A1* | 9/2010 | Demirdjian | A61B 5/18 |
| | | | 340/575 |
| 2018/0326818 A1* | 11/2018 | Hong | B60H 3/0028 |
| 2021/0068739 A1* | 3/2021 | Rundo | A61B 5/117 |
| 2023/0306267 A1* | 9/2023 | Jacob Banville | G06N 3/045 |
| 2024/0188868 A1* | 6/2024 | Lee | A61B 5/389 |

* cited by examiner

METHOD AND APPARATUS FOR CLASSIFYING SUBJECT INDEPENDENT DRIVER STATE USING BIO-SIGNAL

CROSS REFERENCE TO RELATED APPLICATIONS

This application claims the benefit of an earlier filing date of and the right of priority to Korean Application No. 10-2022-0096913, filed on Aug. 3, 2022, the contents of which are incorporated by reference herein in its entirety.

TECHNICAL FIELD

The present disclosure relates to a method and apparatus for classifying a subject-independent driver state using a bio-signal. More specifically, the present disclosure relates to a method and apparatus for classifying a driver state that is robust to a driver change through a state classification model that generates a new driver's bio-signal based on the signal characteristics of the bio-signal.

DESCRIPTION OF RELATED ART

An automobile is a most common means of transportation that solves the limitations of conventional movement in modern society, and various driving assistance functions are being developed in recent years, wherein continuous monitoring of a driver while driving a vehicle is considered very important since functions are provided in a direction that can assist driving through the determination of the driver state.

Conventional monitoring of a driver state may be largely divided into a camera-based monitoring method and a bio-signal-based monitoring method, wherein in the former case, information such as changes in a driver's body and driving habits are monitored through an external device such as a camera or an infrared sensor, but there is a problem in that limitations occur according to a surrounding environment.

The latter, bio-signal-based monitoring, which is a method proposed to solve the problem of camera-based monitoring, monitors a driver state using various bio-signals such as an electrocardiogram (ECG), wherein there are no limitations due to a surrounding environment like the camera-based monitoring method, but it has to exhibit the characteristics of inter-variability and intra-variability due to using a bio-signal. More specifically, it is common for drivers to have some differences in bio-signals (inter-variability), but when bio-signals are collected and compared at different times and sessions, it can be seen that bio-signals having different characteristics are collected even though the same driver wears a device to collect bio-signals, (intra-variability), wherein the bio-signals may be collected differently depending on a measurement time, a driver, a psychological state, and an attachment position of a bio-signal measurement device, which causes an obstacle in accurately determining various driver states, and as a result, a calibration process that takes about 10 to 30 minutes is essential prior to using the measurement device. Calibration refers to a process of readjusting parameters according to the characteristics of current bio-signals of a driver who desires to use the device, wherein in order to measure bio-signals, the device must be worn for a predetermined period of time each time to collect the bio-signals, and thus it is inefficient and provides an excessively uncomfortable user experience, which serves as a major problem that lowers a utilization rate of the bio-signal-based monitoring method.

Despite the foregoing problems of the bio-signal-based monitoring method, the bio-signal remains a very useful sign that can accurately determine a driver state, and thus it is required to develop a new and progressive technology that can accurately determine a driver state without a conventional calibration process. The present disclosure is relevant in this regard.

PRIOR ART LITERATURE

Patent Literature

Korean Patent Registration No. 10-1999211 (Jul. 5, 2019)

SUMMARY

Problems to be Solved

A technical problem to be solved by the present disclosure is to provide a method and apparatus for classifying a subject-independent driver state using a bio-signal that does not require a calibration process according to the characteristics of inter-variability and intra-variability of the bio-signal in determining the driver state according to a bio-signal-based monitoring method.

Another technical problem to be solved by the present disclosure is to provide a method and apparatus for classifying a subject-independent driver state using a bio-signal that can provide a driver-customized driving environment by providing a feedback between a vehicle and a driver through collecting and analyzing the driver's bio-signal in real time while driving so as to accurately determine the driver state.

Still another technical problem to be solved by the present disclosure is to provide a method and apparatus for classifying a subject-independent driver state using a bio-signal that can be used for learning by easily generating data on a new driver without having to through a data augmentation process cumbersomely collect a large amount of data required in a learning process of a learning model.

Technical problems of the present disclosure are not limited to the above-mentioned problems, and other technical problems which are not mentioned herein will be clearly understood by those skilled in the art from the description below.

Means to Solve the Problems

In order to solve the above technical problems, a method of classifying, by an apparatus including a processor and a memory, a subject-independent driver state according to an embodiment of the present disclosure may include (a) learning a state classification model that receives one or more drivers' bio-signal data from a database to output the drivers' state classification results, (b) receiving a new driver's bio-signal, (c) preprocessing the received new driver's bio-signal, and (d) inputting the preprocessed new driver's bio-signal to the state classification model to output the driver's state classification result, wherein bio-signal is at least one of an electroencephalogram (EEG), an electrooculogram (EOG), an electrocardiogram (ECG), and a photoplethysmogram (PPG).

According to an embodiment, for the database, one or more drivers' bio-signal data may be labeled with a driver state at the time when the bio-signal data is collected, and vehicle data at the time when the bio-signal data is collected.

According to an embodiment, the driver state may be a state directly input by a driver or a state quantitatively calculated according to a predetermined event.

According to an embodiment, the driver state may include at least one of a drowsy state through a reaction time in case where the event is a lane change of a vehicle, a stress state in case where the event is repetitive honks from nearby vehicles, and an inattention state in case where the event is a degree to which he or she is focused on a conversation with a fellow passenger.

According to an embodiment, the bio-signal data may be either one of single-modal data that collects a single type of bio-signal, and multi-modal data that collects multiple bio-signals in a complex manner.

According to an embodiment, the step (a) may include at least one of (a-1) receiving one or more drivers' bio-signal data from the database, (a-2) preprocessing the received one or more driver's bio-signal data to input the preprocessed data to the state classification model, (a-3) reclassifying, by the state classification model, a driver state labeled with the one or more drivers' bio-signal data according to a predetermined criterion in consideration of the variability of the preprocessed one or more drivers' bio-signal data, (a-4) calculating, by the state classification model, a feature vector Old according to the reclassified driver state from the one or more drivers' bio-signal data in which the labeled driver state is reclassified according to the predetermined criterion, (a-5) generating, by the state classification model, bio-signal data on drivers other than the one or more drivers having a feature vector New with a low similarity to the calculated feature vector Old, and (a-6) learning, by the state classification model, to improve a similarity between state classification results of the calculated feature vectors Old and New.

According to an embodiment, wherein when the bio-signal data is multi-modal data, preprocessing in step (a-2) may adjust a maximum or minimum value of some bio-signals among multiple bio-signals included in the multi-modal data to be distributed within a range similar to that of the remaining bio-signals.

According to an embodiment, the similarity in steps (a-5) and (a-6) may be calculated using at least one of a Euclidean distance, a cosine similarity, a Kullback-Leibler divergence, and an inner product value of the calculated feature vectors Old and New.

According to an embodiment, the method may further include, subsequent to the step (d), (e) transferring the output the driver's state classification result of to a vehicle electronic control unit (ECU) to provide a feedback according to a driver state.

In order to solve the technical problems, an apparatus of classifying a subject-independent driver state according to another embodiment of the present disclosure may include a network interface, a memory that loads a computer program executed by the processor, and a storage that stores large-capacity network data and the computer program, wherein the computer program executes, by the one or more processors, (A) an operation of learning a state classification model that receives one or more drivers' bio-signal data from a database to output the drivers' state classification results; (B) an operation of receiving a new driver's bio-signal; (C) an operation of preprocessing the received new driver's bio-signal; and (D) an operation of inputting the preprocessed new driver's bio-signal to the state classification model to output the driver's state classification result, wherein the bio-signal is at least one of an electroencephalogram (EEG), an electrooculogram (EOG), an electrocardiogram (ECG), and photoplethysmogram (PPG).

In order to solve the above technical problems, a computer program stored on a computer-readable medium according to still another embodiment of the present disclosure, may include, in connection with a computing apparatus, (AA) learning a state classification model that receives one or more drivers' bio-signal data from a database to output the drivers' state classification results, (BB) receiving a new driver's bio-signal, (CC) preprocessing the received new driver's bio-signal, and (DD) inputting the preprocessed new driver's bio-signal to the state classification model to output the driver's state classification result, wherein the bio-signal is at least one of an electroencephalogram (EEG), an electrooculogram (EOG), an electrocardiogram (ECG), and a photoplethysmogram (PPG).

Advantageous Effects

According to the present disclosure as described above, other driver's bio-signal data, which is new learning data, may be generated from one or more drivers' bio-signal data, which is conventional learning data, and used for learning without having to cumbersomely collect a large amount of learning data in a learning process of a state classification model so as to simplify the collection of learning data, thereby having an effect capable of increasing accessibility to a bio-signal-based monitoring method for all drivers.

Furthermore, as a result, a state classification result may be quickly output by simply inputting a bio-signal received from a new driver to a state classification model so as to completely omit a calibration process according to the characteristics of inter-variability and intra-variability of the bio-signal, thereby having an effect capable of rapidly improving the driver's convenience.

In addition, a driver's state classification result may be transferred to a vehicle ECU to provide a feedback according to a driver state, thereby having an effect capable of providing a driver-customized driving environment optimized for the driver.

Moreover, a driver may be regarded as a user in a broad sense so as to classify an abnormal state of the user in daily life as well as when driving a vehicle, thereby having an effect capable of providing a user-customized service in a true sense that is not limited in scope.

The effects of the present disclosure are not limited to the above-mentioned effects, and other effects that are not mentioned herein will be clearly understood by those skilled in the art from the description below.

DETAILED DESCRIPTION OF THE EMBODIMENTS

Figure 1:
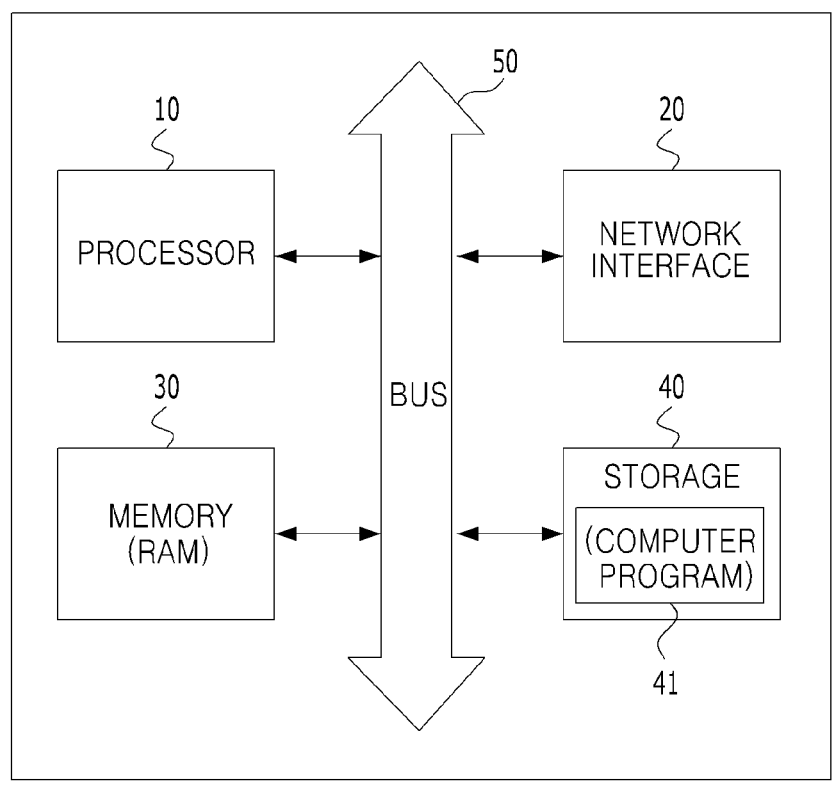
FIG. 1 is a diagram illustratively showing an overall configuration included in an apparatus of classifying a subject-independent driver state using a bio-signal according to a first embodiment of the present disclosure.

The details of the objects and technical configurations of the present disclosure and operational effects thereof will be more clearly understood from the following detailed description based on the accompanying drawings appended hereto. Hereinafter, embodiments according to the present disclosure will be described in detail with reference to the accompanying drawings.

Embodiments disclosed herein should not be interpreted as limiting or used to limit the scope of the present disclosure. It is apparent for those skilled in the art that a description including embodiments herein has various applications. Therefore, any embodiments described in the detailed description of the present disclosure are illustrative for better understanding of the present disclosure and are not intended to limit the scope of the present disclosure to the embodiments.

Functional blocks illustrated in the drawings and described hereunder are only examples of possible implementations. In other implementations, other functional blocks may be used without departing from the concept and scope of the detailed description. Furthermore, one or more functional blocks of the present disclosure are illustrated as separate blocks, but one or more of the functional blocks of the present disclosure may be a combination of various hardware and software elements that execute the same function.

In addition, an expression that some elements are "included" is an expression of an "open type", and the expression simply denotes that the corresponding elements are present, but should not be construed as excluding additional elements.

Moreover, in case where it is mentioned that one element is "connected" or "coupled" to the other element, it should be understood that one element may be directly connected to the other element, but another element may be present therebetween.

Hereinafter, detailed embodiments of the present disclosure will be described with reference to the drawings.

FIG. 1 is a diagram illustratively showing an overall configuration included in an apparatus 100 of classifying a subject-independent driver state using a bio-signal according to a first embodiment of the present disclosure.

However, this is only a preferred embodiment for achieving the objectives of the present disclosure, and some components may be added thereto or deleted therefrom as needed, and a function performed by any one component may, of course, be performed together with other components.

An apparatus 100 of classifying a subject-independent driver state using a bio-signal according to the first embodiment of the present disclosure may include a processor 10, a network interface 20, a memory 30, a storage 40, and a data bus 50 connecting therebetween, and may, of course, further include additional components required to achieve the other objectives of the present disclosure.

The processor 10 controls an overall operation of each component. The processor 10 may be any one of a central processing unit (CPU), a microprocessor unit (MPU), a micro controller unit (MCU), or a type of processor widely known in the art to which the present disclosure pertains. In addition, the processor 10 may perform an operation for at least one application or program to perform a method of classifying a subject-independent driver state using a bio-signal according to a second embodiment of the present disclosure.

The network interface 20 may support wired and wireless Internet communication of the apparatus 100 that classifies a subject-independent driver state using a bio-signal according to the first embodiment of the present disclosure, and may also support t other communication methods. Therefore, the network interface 20 may a include communication module according thereto.

The memory 30 may store various types of information, commands, and/or information, and load one or more computer programs 41 from the storage 40 in order to perform a method of classifying a subject-independent driver state using a bio-signal according to the second embodiment of the present disclosure. Although a RAM is shown as a type of the memory 30 in FIG. 1, various storage media may, of course, be used for the memory 30 in addition thereto.

The storage 40 may non-temporarily store one or more computer programs 41 and mass network information 42. The storage 40 may be any one of a non-volatile memory such as a read only memory (ROM), an erasable programmable ROM (EPROM), an electrically erasable programmable ROM (EEPROM), a flash memory, or the like, a hard disk, a removable disk, and a type of computer-readable recording medium widely known in the art to which the present disclosure pertains.

The computer program 41 may be loaded into the memory 30 to execute, by one or more processors 10, (A) an operation of learning a state classification model that receives one or more drivers' bio-signal data from a database to output the drivers' state classification results, (B) an operation of receiving a new driver's bio-signal, (C) an operation of preprocessing the received new driver's bio-signal, and (D) an operation of inputting the preprocessed new driver's bio-signal to the state classification model to output the driver's state classification result, wherein the bio-signal may be at least one of an electroencephalogram (EEG), an electrooculogram (EOG), an electrocardiogram (ECG), and a photoplethysmogram (PPG).

The operations performed by the computer program 41 briefly mentioned above may be regarded as one function of the computer program 41, and a more detailed description will be described later in the description of a method of classifying a subject-independent driver state using a bio-signal according to the second embodiment of the present disclosure.

The data bus 50 serves as a transfer path for commands and/or information among the processor 10, the network interface 20, the memory 30, and the storage 40 described above.

The apparatus 100 of classifying a subject-independent driver state using a bio-signal according to the first embodiment of the present disclosure described above may be in the form of an independent apparatus, for example, a portable electronic apparatus or a server (including a cloud), and in this case, a measurement devices/tool that measures a corresponding bio-signal according to a type of bio-signal received, for example, an electrodes attached to a surface of a scalp for an electroencephalogram, an electrode attached to a surface of a skin around eyes for an electrooculogram, an electrodes attached to a skin near a heart for an electrocardiogram, and a meter mounted onto a fingertip for a photoplethysmogram, or the like, may be included in the device itself or connected thereto even if not included, and in the case of a bio-signal that can be measured through a wearable device (not shown) worn by the driver, the apparatus 100 of classifying a subject-independent driver state using a bio-signal according to the first embodiment of the present invention may include a Bluetooth module, or the like, thereby allowing the wearable device (not shown) to be connected thereto to receive the bio-signal.

Meanwhile, in this case, a driver's state classification result output by the apparatus 100 of classifying a subject-independent driver state using a bio-signal according to the first embodiment of the present disclosure must be transferred to a vehicle electronic control unit (ECU) or the like to provide a feedback according to the driver state, and thus a separate communication module compatible with a vehicle communication method must be included therein.

In addition, the apparatus 100 of classifying a subject-independent driver state using a bio-signal according to the first embodiment of the present disclosure may not be an independent device but may be a vehicle electrical component, and in this case, it may be provided in an interior space such as a center fascia or dashboard of a vehicle so as to be controlled through a control program.

Hereinafter, on the premise that the apparatus 100 of classifying a subject-independent driver state using a bio-signal according to the first embodiment of the present disclosure is in the form of an independent device, a method of classifying a subject-independent driver state using a bio-signal according to the second embodiment of the present disclosure will be described with reference to FIGS. 2 to 5.

Figure 2:
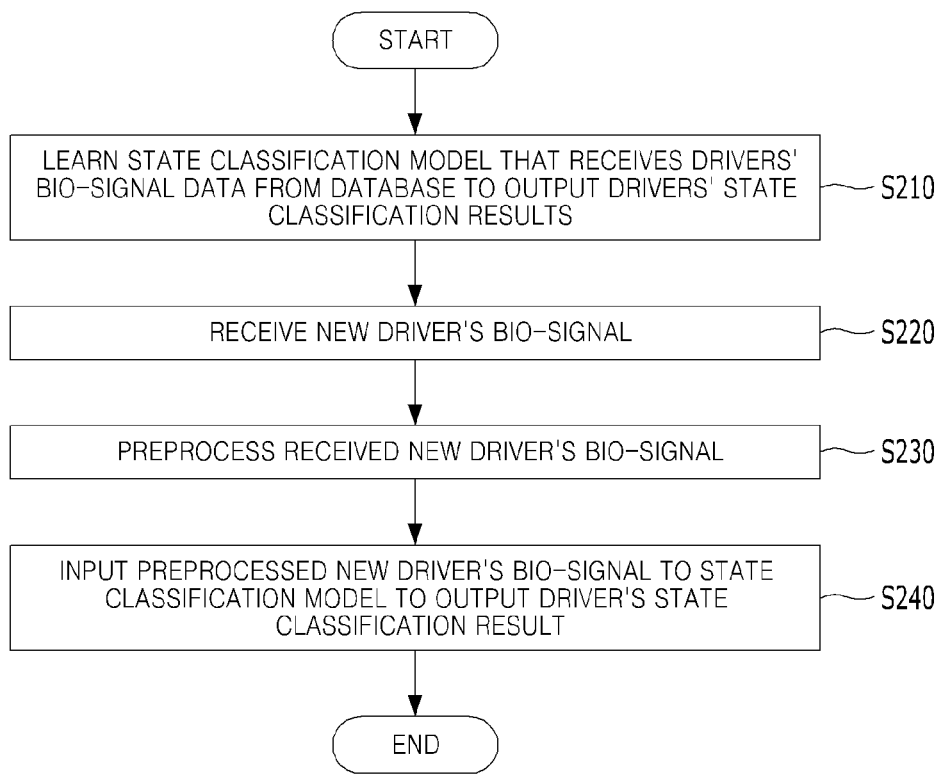
FIG. 2 is a flowchart showing representative steps of a method of classifying a subject-independent driver state using a bio-signal according to a second embodiment of the present disclosure.

FIG. 2 is a flowchart showing representative steps of a method of classifying a subject-independent driver state using a bio-signal according to the second embodiment of the present disclosure.

However, this is only a preferred embodiment in achieving the objectives of the present disclosure, and some steps may be added thereto or deleted therefrom as needed, and any one step may be included in another step to be performed.

Meanwhile, it is assumed that each step is performed through the apparatus 100 of classifying a subject-independent driver sign using a bio-signal according to the first embodiment of the present disclosure, which is named as the apparatus 100 for convenience of explanation.

First, the apparatus 100 receives one or more drivers' bio-signal data from a database (not shown) to learn a state classification model that outputs the drivers' state classification results (S210).

Prior to describing step S210, a database (not shown) that transmits one or more drivers' bio-signal data to the apparatus 100 will be first described.

The database (not shown) may be an internal component included in the apparatus 100, but since it is necessary to collect and store various drivers' bio-signal data, a storage capacity problem may occur, and thus may be preferably an external component that can communicate with the apparatus 100 through a communication means.

The database (not shown) may include bio-signal data, driver state information, and vehicle data measured in various sessions from one or more drivers, wherein more specifically, one or more drivers' bio-signal data may be labeled with a driver state at the time when the bio-signal data is collected, and vehicle data at the time when the bio-signal data is collected (hereinafter, referred to as "data on drivers").

For example, when the database (not shown) collects a bio-signal called an electroencephalogram from driver A, a state of driver A, for example, a drowsy state, a stress state, an inattention state, a motion sickness state, or the like, which is collected at when the time the corresponding electroencephalogram bio-signal data is collected, and vehicle data of driver A, for example, a time period taken to change a lane, a sudden brake event, a lane change without blinking, or the like, which is collected at the time when the corresponding electroencephalogram bio-signal data is collected are labeled therewith, or bio-signal data, a driver state, and vehicle data may be grouped and stored for each driver without being labeled.

In addition, in all of the above cases, data on one or more drivers may be all recorded in a database (not shown) in time series, and configured to compare changes in bio-signals according to the passage of time and the movement of the vehicle with changes in the driver state.

On the other hand, the database (not shown) only needs to collect and hold data on one or more drivers, but it is preferable to collect and hold data measured in as many various sessions as possible from multiple various drivers, since it performs a function of large-capacity data (a type of big data) for a method of classifying a subject-independent driver state using a bio-signal according to the second embodiment of the present disclosure, which classifies a driver state based on augmented learning that takes account of driver-specific characteristic information, which will be described later.

Data on one or more drivers held by the database (not shown), more specifically, a driver state, may be collected through various methods, such that a driver subjectively may evaluate his or her own state to directly input it, or it may be quantitatively calculated according to a predetermined event.

For example, in the former case, a drowsy state may be evaluated and entered based on the Karolinska Sleepiness Scale, and in the latter case, the driver state may include at least one of a drowsy state through a reaction time in case where the event is a lane change of a vehicle, a stress state in case where the event is repetitive honks from nearby vehicles, and an inattention state in case where the event is a degree to which he or she is focused on a conversation with a fellow passenger, and in addition to those examples, various driver states may be collected through more various events.

Meanwhile, one or more drivers' bio-signal data may be either one of single-modal data that collects a single type of bio-signal and multi-modal data that collects multiple bio-signals in a complex manner, and since multiple bio-signals are collected in a complex manner in the latter case, a separate preprocessing process is required in the preprocessing process to be described later, and will be described later in the relevant section.

Now, specifically describing step S210, the apparatus 100 receives one or more drivers' bio-signal data from the above-described database (not shown) to learn a state classification model that outputs a state classification result, and the step S210 will be described below with reference to FIG. 3.

Figure 3:
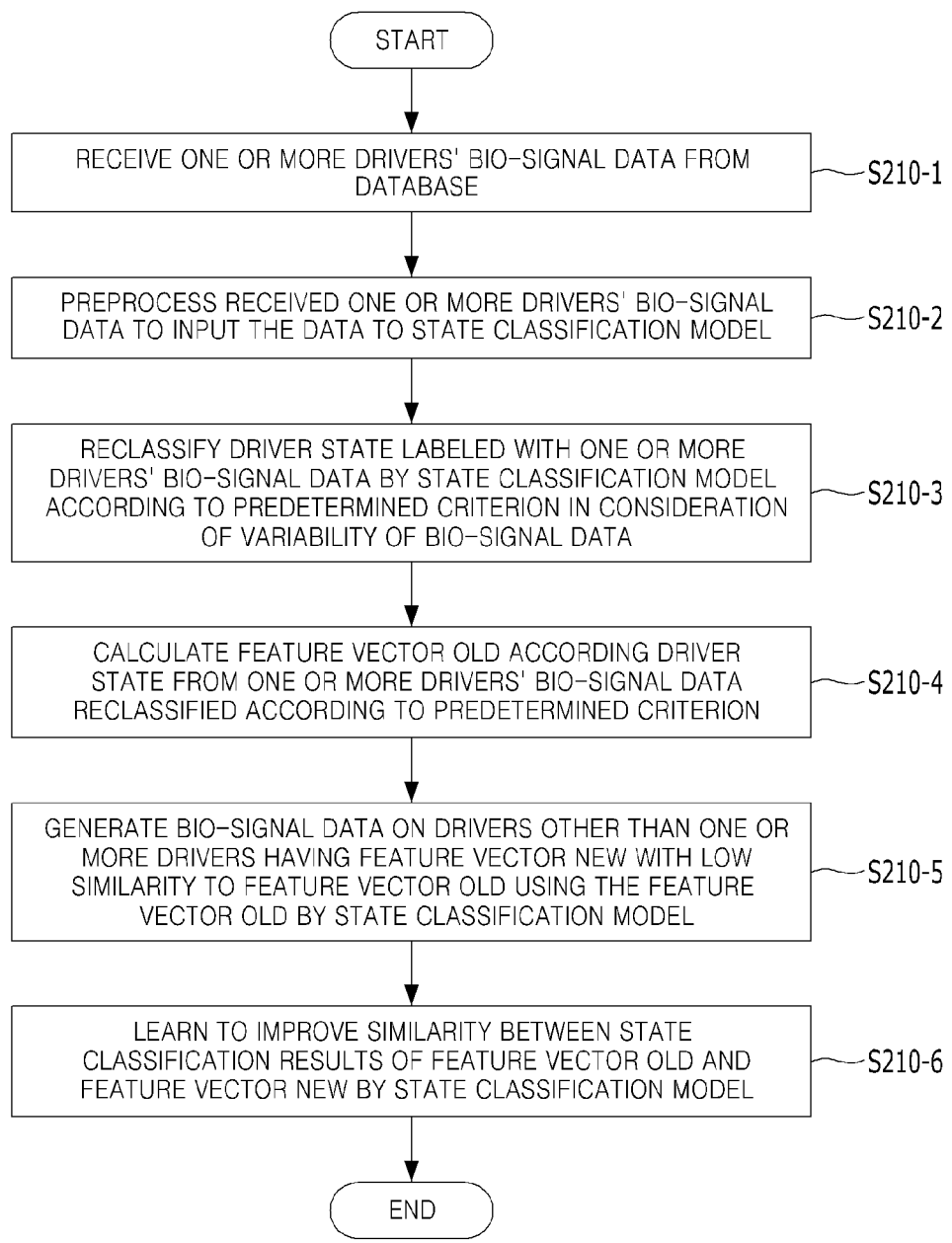
FIG. 3 is a flowchart embodying step S210 of learning a state classification model in the method of classifying a driver state independent of a user using a bio-signal according to the second embodiment of the present disclosure.

FIG. 3 is a flowchart embodying step S210 of learning a state classification model in the method of classifying a driver state independent of a user using a bio-signal according to the second embodiment of the present disclosure.

However, this is only a preferred embodiment in achieving the objectives of the present disclosure, and some steps may be added thereto or deleted therefrom as needed, and any one step may be included in another step to be performed.

First, the apparatus 100 receives one or more drivers' bio-signal data from a database (not shown) (S210-1).

Here, one or more bio-signal data has been described above in the description of the database (not shown), and thus a detailed descriptions will be omitted to prevent redundant description, and the bio-signal data of multiple drivers may be simultaneously received due to one or more drivers' bio-signal data, but in this case, the processor 10 may be preferably implemented as a processor capable of parallel processing in consideration of an operation speed of the apparatus 100.

Then, the apparatus 100 preprocesses the received one or more drivers' bio-signal data to input the preprocessed data to a state classification model (S210-2).

Here, since the state classification model corresponds to one type of artificial intelligence model that performs a deep learning function, the processor 10 of the apparatus 100 may be an artificial intelligence processor, and accordingly, typical preprocessing including noise removal performed prior to inputting data to the artificial intelligence model may be performed for the preprocessing.

Meanwhile, in the foregoing description of the bio-signal data, the bio-signal data may be multi-modal data obtained by collecting multiple bio-signals in a complex manner, and in this case, a separate preprocessing process may be required, wherein preprocessing in step S210-2 may be preprocessing that adjusts a maximum or minimum value of some bio-signals among the multiple bio-signals included in the multi-modal data to be distributed within a range similar to that of the remaining bio-signals.

For example, in case where multi-modal data includes bio-signals A to C, a maximum value of bio-signal A is 100 and a minimum value thereof is 50, a maximum value of bio-signal B is 90 and a minimum value thereof is 60, and a maximum value of bio-signal C is 100 and a minimum value thereof is 150, the unit or scale of bio-signal C is adjusted to be distributed within a range of the maximum and minimum values of bio-signals A and B, and a reason why the adjustment is allowed may be because the driver state can be classified by analyzing a trend of bio-signal patterns rather than individual values of the bio-signals.

The apparatus 100 inputs the preprocessed one or more drivers' bio-signal data to a state classification model, and the bio-signal data may correspond to learning data used to learn the state classification model.

Then, the apparatus 100 reclassifies a driver state labeled with one or more drivers' bio-signal data by the state classification model according to a predetermined criterion in consideration of the variability of the preprocessed one or more drivers' bio-signal data (S210-3).

The step S210-3 may be regarded as a process of universally and intuitively reclassifying a driver label in consideration of the variability of bio-signals, and may be selectively performed according to a predetermined criterion to check the driver state, wherein the variability of bio-signal data refers to the characteristics of bio-signals, such as inter-variability and intra-variability, because the bio-signal data measured from the same driver in different sessions may be defined as data collected from drivers with different driver-specific characteristics, that is, different styles, and bio-signals measured in the same session may be regarded as data collected from drivers with the same characteristics, that is, the same style. The state classification model learns common characteristics of multiple drivers according to each state rather than specific characteristics or styles of each driver represented in one or more drivers' bio-signal data, which is learning data, thereby minimizing an effect according to the variability of bio-signal data as well as outputting an accurate state classification result when the apparatus 100 later receives a new driver's bio-signal to output a state classification result through a state classification model.

Meanwhile, a predetermined criterion for reclassifying the collected state labels on one or more drivers may be set in various ways, and for example, as a driver's state classification task, a driver state may be classified into two classes, such as a drowsy state or a normal state at the time of collecting each bio-signal data based on the trend of short-term and long-term reaction times, and as a state regression task, a driver's reaction time according to a lane change of a vehicle may be transformed into an index of a continuous drowsy state.

Then, the apparatus 100 calculates a feature vector Old according a driver state reclassified from one or more drivers' bio-signal data in which the driver state labeled by the state classification model is reclassified according to a predetermined criterion (S210-4).

In order to calculate the feature vector Old according to the reclassified driver state, the state classification model may include a Convolutional Neural Network (CNN) or a Recurrent Neural Network (RNN), and the calculating the feature vector Old from data utilizing those networks is a well-known method, and thus a detailed description thereof will be omitted.

Then, the apparatus 100 generates bio-signal data on drivers other than one or more drivers having a feature vector New with a low similarity to the feature vector Old calculated by the state classification model using the feature vector Old (S210-5), and learns to improve a similarity between state classification results of the feature vector Old and the feature vector New calculated by the state classification model (S210-6).

Steps S210-5 and S210-6, which are key processes of easily generating data on a new driver through a data augmentation process to use the data for learning without having to cumbersomely collect a large amount of data required in a learning process of the state classification model in a method of classifying a subject-independent driver state using a bio-signal according to the second embodiment of the present disclosure, may be regarded as a type of data augmentation learning step.

Figure 4:
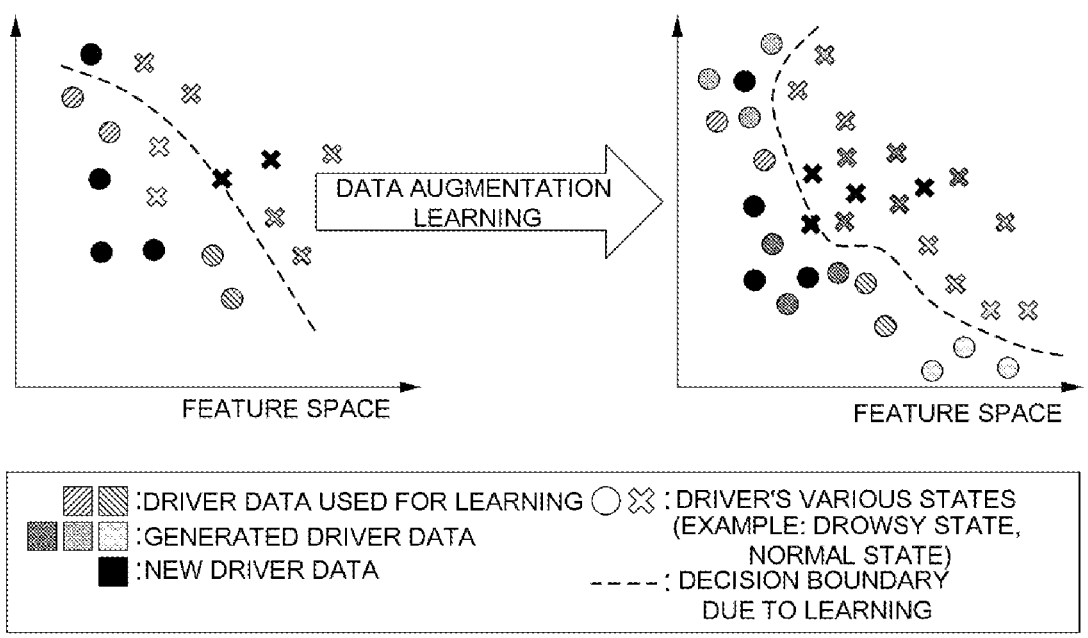
FIG. 4 is a diagram illustratively showing a result through data augmentation learning.

FIG. 4 illustratively shows a result through data augmentation learning, wherein looking at a diagram on the left, it can be seen user data used for learning with respect to a driver state indicated by a circle ("O"), for example, a normal state, and a driver state indicated by an "X", for example, a drowsy state, and a decision boundary resulting from the learning, and it can be seen that data in a normal state are distributed inside the decision boundary due to learning, and data in a drowsy state are distributed outside, whereas for new user data, it can be seen that data in a drowsy state are also distributed inside the decision boundary due to learning, and data in a normal state are also distributed outside the decision boundary.

In this regard, a feature vector Old is calculated from the user data used for learning, and looking at a diagram on the right, wherein bio-signal data on drivers other than one or more drivers (users corresponding to the user data used for learning) having a feature vector New with a low similarity thereto are generated to perform the learning process again, the generated user data has a low similarity to the user data used in the existing learning, but the decision boundary due to the learning is changed, and as a result, it can be seen that data in a normal state are distributed inside the decision boundary due to new user data learning, and data in a drowsy state are distributed outside.

This is because a decision boundary that determines a driver state through a data augmentation process is learned to robustly classify the driver state with respect to newly generated user data, and thus it can be seen that only a feature vector corresponding to style information has been changed, and a feature vector New calculated from newly generated bio-signal data for drivers other than one or more drivers and a feature vector Old calculated from user data used for previous learning may include useful features for driver-specific style information and task classification.

Meanwhile, in generating bio-signal data on drivers other than one or more drivers, new style of data may be generated using a method of combining various drivers' characteristics or distribution information by multiplying them with a predetermined weight, and a method of generating noise similar to existing features, such as a generative adversarial network (GAN), and a similarity decrease function may be implemented to decrease a similarity between two bio-signal data so as to a low style generate different bio-signal data showing similarity to user data used for learning, and a final loss function (L) of the state classification model may be defined as follows.

Final loss function $(L) = L\text{task ori} + L\text{task gen} + \alpha L\text{similar style} \; \beta L\text{similar task}$ $\alpha, \beta$ are user-defined parameters More specifically describing the foregoing final loss function (L), first of all, in order to show high performance in terms of task classification by comparing the feature classification performances of respective feature vectors, a task classification loss function may be defined as "Ltask ori+ Ltask gen" such that the existing feature vector Old and the generated feature vector New respectively show excellent task classification performances, and a loss function such as a cross entropy, a mean squared error, or the like, may be used for the task classification loss function.

Next, as a function that compares a similarity between two feature vectors, a similarity decrease function that can decrease the similarity to generate different bio-signal data showing a low style similarity may be defined as Lsimilar style, wherein the similarity decrease function may use at least one of a Euclidean distance, a Kullback-Leibler divergence, and an inner product value of the calculated feature vectors Old and New.

Finally, as a function of comparing result values of task classification networks for the existing feature vector Old and the generated feature vector New, a similarity increase function of the classification result of a driver state for learning an excellent expression that improves generalization performance due to a similarity between the classification results of the two feature vectors may be defined as Lsimilar task, wherein the similarity increase function may use at least one of a Euclidean distance and a cosine similarity.

That is, the final loss function (L) may be defined by adding a similarity increase function and a similarity decrease function to a task classification loss function of the existing bio-signal data and a task classification loss function of the generated bio-signal data as constraint conditions, a degree of normalization may be adjusted by multiplying respective loss functions by user-defined weights a and B, wherein giving relatively large weights to the two similarity-related functions may affect classifier performance improvement and fast learning.

Since the state classification model uses such a final loss function (L), the diversity of learning data may be increased by generating a new driver's bio-signal data with a low similarity to one or more drivers in step S210-5, thereby learning through experiencing the bio-signal data of the new driver whose style is very different from the one or more drivers as well as learning features common to various drivers according to respective driver states rather than driver-specific styles in the learning data.

Learning of the state classification model may be carried out according to step S210 described so far, and the description of FIG. 2 will be further described below.

When the state classification model has been learned, the apparatus 100 receives a new driver's bio-signal (S220), preprocesses the received new driver's bio-signal (S230), and then inputs the preprocessed new driver's bio-signal to the state classification model to output the driver's state classification result (S240).

Here, the description of steps S220 and S230 is the same as the description of steps S210-1 and S210-2, and thus a detailed description will be omitted to prevent redundant description, and in the case of step S240, it will be sufficient to perform only driver state classification without a data augmentation process using the learned weight applied to respective loss functions in the existing learning process.

So far, a method of classifying a subject-independent driver state according to the second embodiment of the present disclosure has been described. According to the present disclosure, other driver's bio-signal data, which is new learning data, may be generated from one or more drivers' bio-signal data, which is conventional learning data, and used for learning without having to cumbersomely collect a large amount of learning data in a learning process of a state classification model so as to simplify the collection of learning data, thereby increasing accessibility to a bio-signal-based monitoring method for all drivers. Furthermore, as a result, a state classification result may be quickly output by simply inputting a bio-signal received from a new driver to a state classification model so as to completely omit a calibration process according to the characteristics of inter-variability and intra-variability of the bio-signal, thereby rapidly improving the driver's convenience.

Figure 5:
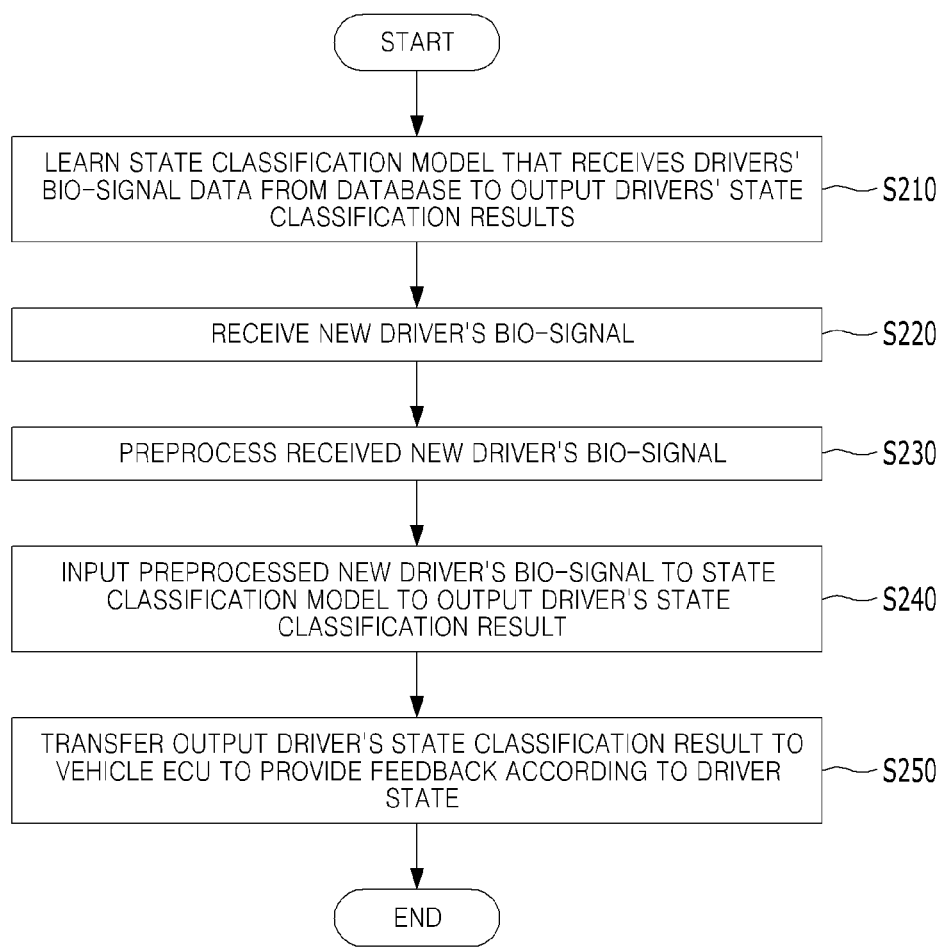
FIG. 5 is a flowchart in which utilizing a state classification result for vehicle control is added in the method of classifying a subject-independent driver state using a bio-signal according to the second embodiment of the present disclosure.

On the other hand, the method of classifying a subject-independent driver state using a bio-signal according to the second embodiment of the present disclosure may further include, subsequent to step S240, transferring a driver's state classification result output by the apparatus 100 to a vehicle electronic control unit (ECU) to provide a feedback according to a driver state (S250) as shown in the flowchart of FIG. 5, wherein for example, a feedback of opening a window of the vehicle when the driver is classified as a drowsy state, a feedback of playing music to clear his or her head when the driver is classified as a stress state, and so on, may be provided, thereby providing a driver-customized driving environment optimized for the driver.

Moreover, a driver may be regarded as a user in a broad sense so as to classify an abnormal state of the user in daily life as well as when driving a vehicle, thereby having an effect capable of providing a user-customized service in a true sense that is not limited in scope, and thus the application areas of the present disclosure will be limitless.

Figure 6:
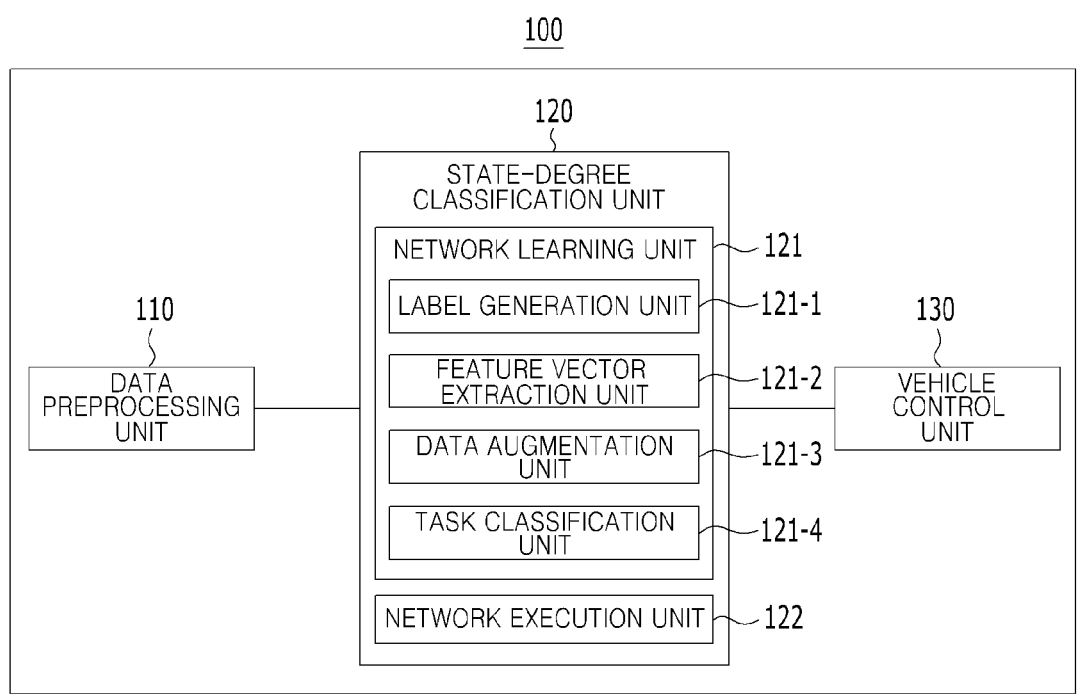
FIG. 6 is a diagram showing an apparatus of classifying a subject-independent driver state according to the first embodiment of the present disclosure in a form including functional configurations in a different manner from that of FIG. 1.

On the other hand, FIG. 6 is a diagram showing an apparatus 100 of classifying a subject-independent driver state according to the first embodiment of the present disclosure in a form including functional configurations in a different manner from that of FIG. 1.

Referring to FIG. 6, the apparatus 100 of classifying a subject-independent driver state using a bio-signal according to the first embodiment of the present disclosure may include a data preprocessing unit 110, a state-degree classification unit 120, and a vehicle control unit 130, wherein it can be seen that the state-degree classification unit 120 includes a network learning unit 121 and a network execution unit 122, and the network learning unit 121 includes a label generation unit 121-1, a feature vector extraction unit 121-2, a data augmentation unit 121-3, and a task classification unit 121-4, and a description of each functional component will be replaced with the description of the method of classifying a subject-independent driver state using a bio-signal according to the second embodiment of the present disclosure.

Figure 7:
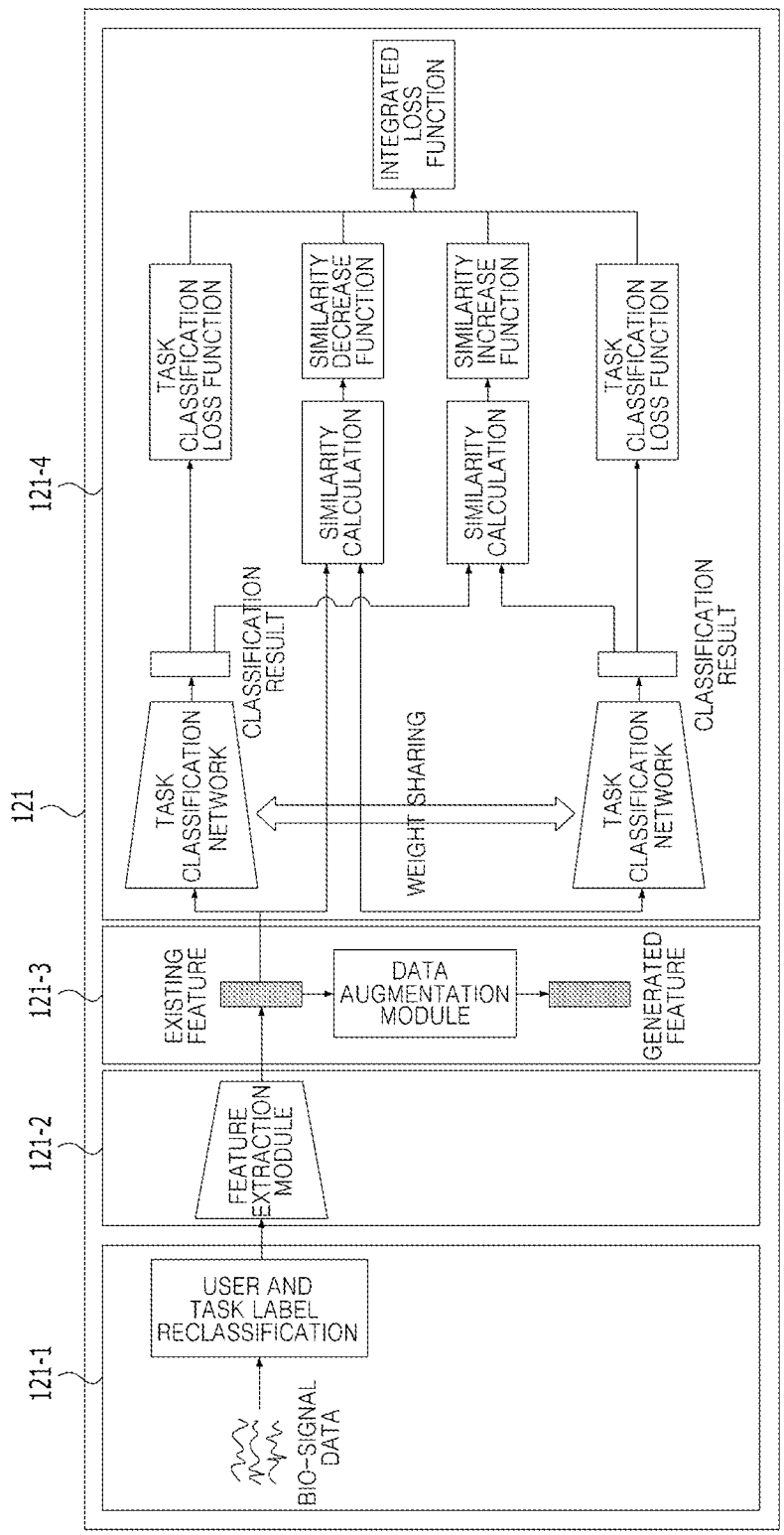
FIG. 7 is a flowchart of state classification model learning performed in a network learning unit shown in FIG. 6.

FIG. 7 is a flowchart of state classification model learning performed in the network learning unit 121, wherein a task classification network for the existing feature vector Old and a task classification network for the new feature vector New included in the task classification unit 121-4 are configured such that parameters are shared with each other, allowing drivers' state task classification results, which are task classification results, to be similar to each other, and a detailed description of FIG. 7 will also be replaced with the description of the method of classifying a subject-independent driver state using a bio-signal according to the second embodiment of the present disclosure.

Finally, the apparatus 100 of classifying a subject-independent driver state using a bio-signal according to the first embodiment of the present disclosure and the method of classifying a subject-independent driver state using a bio-signal according to the second embodiment of the present disclosure may be implemented as a computer program stored in a computer-readable medium according to a third embodiment of the present disclosure, which includes all technical features in a similar manner, wherein in this case, the computer program may include, in connection with a computing apparatus, (AA) learning a state classification model that receives one or more driver's bio-signal data from a database and outputs the drivers' state classification results; (BB) receiving a new driver's bio-signal, (CC) preprocessing the received new driver's bio-signal, and (DD) inputting the preprocessed new driver's bio-signal to the state classification model to output the driver's state classification result, and although not described in detail for redundancy, all technical features applied to the apparatus 100 of classifying a subject-independent driver state using a bio-signal according to the first embodiment of the present disclosure and the method of classifying a subject-independent driver state using a bio-signal according to the second embodiment of the present disclosure may, of course, be applicable to the computer program stored in the computer-readable medium according to a third embodiment of the present disclosure.

As described above, the embodiments of the present disclosure have been described with reference to the accompanying drawings, but it will be apparent to those skilled in the art to which the invention pertains that the invention can be embodied in other specific forms without departing from the concept and essential characteristics thereof. Therefore, it should be understood that the foregoing embodiments are merely illustrative but not restrictive in all aspects.

The invention claimed is:

1. A method of classifying, by an apparatus including a processor and a memory, a subject-independent driver state, the method comprising:
    (a) learning a state classification model that receives one or more drivers' bio-signal data from a database to output the drivers' state classification result;
    (b) receiving a new driver's bio-signal;
    (c) preprocessing the received new driver's bio-signal; and
    (d) inputting the preprocessed new driver's bio-signal to the state classification model to output the driver's state classification result,
    wherein the bio-signal is at least one of an electroencephalogram (EEG), an electrooculogram (EOG), an electrocardiogram (ECG), and a photoplethysmogram (PPG), and
    wherein the step (a) comprises at least one of:
    (a-1) receiving one or more drivers' bio-signal data from the database;
    (a-2) preprocessing the received one or more driver's bio-signal data to input the preprocessed data to the state classification model;
    (a-3) reclassifying, by the state classification model, a driver state labeled with the one or more drivers' bio-signal data based on a predetermined criterion in consideration of the variability of the preprocessed one or more drivers' bio-signal data;
    (a-4) calculating, by the state classification model, a feature vector Old based on the reclassified driver state from the one or more drivers' bio-signal data in which the labeled driver state is reclassified according to the predetermined criterion;
    (a-5) generating, by the state classification model, bio-signal data on drivers other than the one or more drivers having a feature vector New with a low similarity to the calculated feature vector Old; and
    (a-6) learning the state classification model based on a final loss function (L) that is defined by adding a similarity increase function and a similarity decrease function to a task classification loss function as constraint conditions, to improve a similarity between state classification results of the calculated feature vectors Old and New,
    wherein the similarity decrease function decreases a style similarity between the feature vector Old and the feature vector New,
    wherein the similarity increase function increases a result similarity between state classification results of the feature vector Old and the feature vector New to improve generalization performance, and
    wherein the similarity in the steps (a-5) and (a-6) is calculated using at least one of a Euclidean distance, a cosine similarity, a Kullback-Leibler divergence, and an inner product value of the calculated feature vectors Old and New.

2. The method of claim 1,
    wherein for the database, one or more drivers' bio-signal data are labeled with a driver state at the time when the bio-signal data is collected, and vehicle data at the time when the bio-signal data is collected.

3. The method of claim 2, wherein the driver state is a state directly input by a driver or a state quantitatively calculated according to a predetermined event.

4. The method of claim 3, wherein the driver state comprises at least one of a drowsy state through a reaction time in case where the event is a lane change of a vehicle, a stress state in case where the event is repetitive honks from nearby vehicles, and an inattention state in case where the event is a degree to which he or she is focused on a conversation with a fellow passenger.

5. The method of claim 2, wherein the bio-signal data is either one of single-modal data that collects a single type of bio-signal, and multi-modal data that collects multiple bio-signals in a complex manner.

6. The method of claim 1, wherein when the step (a) further comprises the step (a-2) and the bio-signal data is multi-modal data, the preprocessing in the step (a-2) adjusts a maximum or minimum value of some bio-signals among multiple bio-signals included in the multi-modal data to be distributed within a range similar to that of the remaining bio-signals.

7. The method of claim 1, further comprising: subsequent to the step (d), (e) transferring the output driver's state classification result to a vehicle electronic control unit (ECU) to provide a feedback according to a driver state.

8. An apparatus for classifying a subject-independent driver state, the apparatus comprising: one or more processors; a network interface; a memory that loads a computer program executed by the processor; and a storage that stores large-capacity network data and the computer program,
wherein the computer program comprising instructions that, when executed by the one or more processors of the apparatus, cause the one or more processors to perform:
an operation of learning a state classification model that receives one or more drivers' bio-signal data from a database to output the drivers' state classification results;
an operation of receiving a new driver's bio-signal;
an operation of preprocessing the received new driver's bio-signal; and
an operation of inputting the preprocessed new driver's bio-signal to the state classification model to output the driver's state classification result,
wherein the bio-signal is at least one of an electroencephalogram (EEG), an electrooculogram (EOG), an electrocardiogram (ECG), and a photoplethysmogram (PPG), and
wherein the operation of learning a state classification model comprises at least one of:
receiving one or more drivers' bio-signal data from the database;
preprocessing the received one or more driver's bio-signal data to input the preprocessed data to the state classification model;
reclassifying, by the state classification model, a driver state labeled with the one or more drivers' bio-signal data based on a predetermined criterion in consideration of the variability of the preprocessed one or more drivers' bio-signal data;

calculating, by the state classification model, a feature vector Old based on the reclassified driver state from the one or more drivers' bio-signal data in which the labeled driver state is reclassified according to the predetermined criterion;
generating, by the state classification model, bio-signal data on drivers other than the one or more drivers having a feature vector New with a low similarity to the calculated feature vector Old; and
learning the state classification model based on a final loss function (L) that is defined by adding a similarity increase function and a similarity decrease function to a task classification loss function as constraint conditions, to improve a similarity between state classification results of the calculated feature vectors Old and New,
wherein the similarity decrease function decreases a style similarity between the feature vector Old and the feature vector New,
wherein the similarity increase function increases a result similarity between state classification results of the feature vector Old and the feature vector New to improve generalization performance, and
wherein the similarity in the generating and learning steps is calculated using at least one of a Euclidean distance, a cosine similarity, a Kullback-Leibler divergence, and an inner product value of the calculated feature vectors Old and New.

9. A non-transitory computer-readable recording medium storing a computer program comprising instructions that, when executed by a processor of a computer apparatus, cause the processor to perform a method comprising:
learning a state classification model that receives one or more drivers' bio-signal data from a database to output the drivers' state classification results;
receiving a new driver's bio-signal;
preprocessing the received new driver's bio-signal; and
inputting the preprocessed new driver's bio-signal to the state classification model to output the driver's state classification result,
wherein the bio-signal is at least one of an electroencephalogram (EEG), an electrooculogram (EOG), an electrocardiogram (ECG), and a photoplethysmogram (PPG), and
wherein the learning of the state classification model comprises at least one of:
receiving one or more drivers' bio-signal data from the database;
preprocessing the received one or more driver's bio-signal data to input the preprocessed data to the state classification model;
reclassifying, by the state classification model, a driver state labeled with the one or more drivers' bio-signal data based on a predetermined criterion in consideration of the variability of the preprocessed one or more drivers' bio-signal data;
calculating, by the state classification model, a feature vector Old based on the reclassified driver state from the one or more drivers' bio-signal data in which the labeled driver state is reclassified according to the predetermined criterion;
generating, by the state classification model, bio-signal data on drivers other than the one or more drivers having a feature vector New with a low similarity to the calculated feature vector Old; and
learning the state classification model based on a final loss function (L) that is defined by adding a similarity increase function and a similarity decrease function to a task classification loss function as constraint conditions, to improve a similarity between state classification results of the calculated feature vectors Old and New, wherein the similarity decrease function decreases a style similarity between the feature vector Old and the feature vector New, wherein the similarity increase function increases a result similarity between state classification results of the feature vector Old and the feature vector New to improve generalization performance, and wherein the similarity in the generating and learning steps is calculated using at least one of a Euclidean distance, a cosine similarity, a Kullback-Leibler divergence, and an inner product value of the calculated feature vectors Old and New.

\* \* \* \* \*